United States Patent
Smith et al.

(10) Patent No.: US 9,390,577 B2
(45) Date of Patent: Jul. 12, 2016

(54) SYSTEM AND METHOD FOR OPTIMIZING UTILIZATION OF INVENTORY SPACE FOR DISPENSABLE ARTICLES

(71) Applicant: Redbox Automated Retail, LLC, Oakbrook Terrace, IL (US)

(72) Inventors: Thomas Franklin Smith, Downers Grove, IL (US); William Martinka, Chicago, IL (US); Jim Polubinski, Palos Hills, IL (US)

(73) Assignee: REDBOX AUTOMATED RETAIL, LLC, Oakbrook Terrace, IL (US)

( * ) Notice: Subject to any disclaimer, the term of this patent is extended or adjusted under 35 U.S.C. 154(b) by 0 days.

(21) Appl. No.: 14/310,674

(22) Filed: Jun. 20, 2014

(65) Prior Publication Data

US 2014/0367399 A1    Dec. 18, 2014

Related U.S. Application Data

(63) Continuation of application No. 13/414,612, filed on Mar. 7, 2012, now Pat. No. 8,768,789.

(51) Int. Cl.
*G06Q 10/00* (2012.01)
*G06Q 20/00* (2012.01)
(Continued)

(52) U.S. Cl.
CPC .............. *G07F 11/54* (2013.01); *G07F 9/026* (2013.01); *G07F 11/002* (2013.01); *Y10T 29/49002* (2015.01)

(58) Field of Classification Search
CPC ... G06Q 10/087; G06Q 20/203; G06Q 10/08; G06Q 10/0875; G06Q 10/06; G06Q 20/1085; G06Q 30/06; G06Q 20/202; G07F 19/20; G07F 40/00; G07F 19/201; G07F 20/40

USPC ................................................. 705/28, 22, 43
See application file for complete search history.

(56) References Cited

U.S. PATENT DOCUMENTS

| | | | |
|---|---|---|---|
| 1,901,243 | A | 3/1933 | Horwitt |
| 2,098,697 | A | 11/1937 | Vanderput |

(Continued)

FOREIGN PATENT DOCUMENTS

| | | |
|---|---|---|
| CA | 1236546 A1 | 5/1988 |
| CA | 2302753 A1 | 5/1999 |

(Continued)

OTHER PUBLICATIONS

Technophobe's best friend by MaClatchy, Smith Erika, McClatchy—Tribune Business news Oct. 22, 2007.*

(Continued)

*Primary Examiner* — Matthew Gart
*Assistant Examiner* — Harshad Parikh
(74) *Attorney, Agent, or Firm* — James P. Muraff; Neal, Gerber & Eisenberg LLP

(57) ABSTRACT

A system and method for optimizing the utilization of inventory space for articles dispensable from an article dispensing machine is provided. A subset of articles in the article dispensing machine may be targeted for removal for various purposes. Based on a list of the subset of articles, the article dispensing machine may move the subset of articles from a storage unit to a predetermined area, such as a merchandising zone of the storage unit or a separate article removal bin. The subset of articles may be removed from the predetermined area, followed by loading of new articles to the predetermined area.

20 Claims, 8 Drawing Sheets

(51) Int. Cl.
*G06Q 40/00* (2012.01)
*G07F 11/54* (2006.01)
*G07F 11/00* (2006.01)
*G07F 9/02* (2006.01)

(56) References Cited

U.S. PATENT DOCUMENTS

| | | | |
|---|---|---|---|
| 2,549,624 A | 4/1951 | Moore | |
| 2,559,599 A | 7/1951 | Crump et al. | |
| 2,562,293 A | 7/1951 | Bourquin | |
| 3,267,436 A | 8/1966 | Alpert et al. | |
| 3,379,295 A | 4/1968 | Varley | |
| 3,529,155 A | 9/1970 | Hansen | |
| 3,591,046 A * | 7/1971 | Corbin | 221/155 |
| 3,622,995 A | 11/1971 | Dilks et al. | |
| 3,627,172 A * | 12/1971 | Gore et al. | 221/129 |
| 3,648,241 A | 3/1972 | Naito et al. | |
| 3,824,544 A | 7/1974 | Simjian | |
| 3,826,344 A | 7/1974 | Wahlberg | |
| 3,831,807 A | 8/1974 | Deaton et al. | |
| 3,893,588 A * | 7/1975 | Patrick | 221/85 |
| 3,907,160 A * | 9/1975 | Moore | 221/84 |
| 3,946,220 A | 3/1976 | Brobeck et al. | |
| 3,964,577 A | 6/1976 | Bengtsson | |
| 4,043,483 A * | 8/1977 | Gore et al. | 221/155 |
| 4,073,368 A | 2/1978 | Mustapick | |
| 4,121,707 A * | 10/1978 | Jacobs et al. | 194/219 |
| 4,148,412 A * | 4/1979 | Lotspeich | 221/75 |
| 4,282,575 A * | 8/1981 | Hoskinson et al. | 700/238 |
| 4,300,040 A | 11/1981 | Gould et al. | |
| 4,306,219 A | 12/1981 | Main et al. | |
| 4,341,325 A * | 7/1982 | Lowdermilk | 221/211 |
| 4,348,551 A | 9/1982 | Nakatani et al. | |
| 4,350,264 A * | 9/1982 | Muller | 221/67 |
| 4,369,422 A | 1/1983 | Rasmussen et al. | |
| 4,369,442 A | 1/1983 | Werth et al. | |
| 4,371,093 A * | 2/1983 | Berger | 221/90 |
| 4,385,366 A | 5/1983 | Housey, Jr. | |
| 4,388,689 A | 6/1983 | Hayman et al. | |
| 4,396,985 A | 8/1983 | Ohara | |
| 4,412,607 A * | 11/1983 | Collins et al. | 194/216 |
| 4,414,467 A | 11/1983 | Gould et al. | |
| 4,415,065 A | 11/1983 | Sandstedt | |
| 4,429,806 A * | 2/1984 | Schwarzli | 221/20 |
| 4,429,807 A * | 2/1984 | Enders | 221/75 |
| 4,449,186 A | 5/1984 | Kelly et al. | |
| 4,458,802 A * | 7/1984 | Maciver et al. | 194/205 |
| 4,469,242 A * | 9/1984 | Costa | 221/4 |
| 4,496,074 A * | 1/1985 | Owens | 221/39 |
| 4,515,290 A * | 5/1985 | Fishler | 221/124 |
| 4,519,522 A | 5/1985 | McElwee | |
| 4,521,008 A * | 6/1985 | Granzow et al. | 271/3.15 |
| 4,530,067 A | 7/1985 | Dorr | |
| 4,547,851 A | 10/1985 | Kurland | |
| 4,553,222 A | 11/1985 | Kurland et al. | |
| 4,561,564 A * | 12/1985 | Negishi | 221/64 |
| 4,567,359 A | 1/1986 | Lockwood | |
| 4,569,421 A | 2/1986 | Sandstedt | |
| 4,574,980 A * | 3/1986 | Kurosawa et al. | 221/116 |
| RE32,115 E | 4/1986 | Lockwood et al. | |
| 4,598,810 A | 7/1986 | Shore et al. | |
| 4,649,481 A | 3/1987 | Takahashi | |
| 4,650,977 A | 3/1987 | Couch | |
| 4,668,150 A | 5/1987 | Blumberg | |
| 4,669,596 A | 6/1987 | Capers et al. | |
| 4,675,515 A | 6/1987 | Lucero | |
| 4,706,794 A | 11/1987 | Awane et al. | |
| 4,722,053 A | 1/1988 | Dubno et al. | |
| 4,723,212 A | 2/1988 | Mindrum et al. | |
| 4,734,005 A | 3/1988 | Blumberg | |
| 4,766,548 A | 8/1988 | Cedrone et al. | |
| 4,767,917 A | 8/1988 | Ushikubo | |
| 4,775,935 A | 10/1988 | Yourick | |
| 4,778,983 A | 10/1988 | Ushikubo | |
| 4,789,045 A | 12/1988 | Pugh | |
| 4,789,054 A | 12/1988 | Shore et al. | |
| 4,797,818 A | 1/1989 | Cotter | |
| 4,812,629 A | 3/1989 | O'Neil et al. | |
| 4,812,985 A | 3/1989 | Hambrick et al. | |
| 4,814,592 A | 3/1989 | Bradt et al. | |
| 4,814,985 A | 3/1989 | Swistak | |
| 4,821,917 A | 4/1989 | Brown | |
| 4,825,045 A | 4/1989 | Humble | |
| 4,839,505 A | 6/1989 | Bradt et al. | |
| 4,839,507 A | 6/1989 | May | |
| 4,847,764 A | 7/1989 | Halvorson | |
| 4,858,743 A | 8/1989 | Paraskevakos et al. | |
| 4,860,876 A * | 8/1989 | Moore et al. | 194/205 |
| 4,866,661 A | 9/1989 | De Prins | |
| 4,875,598 A | 10/1989 | Dahl | |
| 4,882,475 A | 11/1989 | Miller et al. | |
| 4,884,992 A * | 12/1989 | Grimes | 453/29 |
| 4,893,705 A | 1/1990 | Brown | |
| 4,893,727 A | 1/1990 | Near | |
| 4,896,024 A | 1/1990 | Morello et al. | |
| 4,903,815 A | 2/1990 | Hirschfeld et al. | |
| 4,915,205 A | 4/1990 | Reid et al. | |
| D308,052 S | 5/1990 | Darden et al. | |
| 4,941,841 A | 7/1990 | Darden et al. | |
| 4,945,428 A | 7/1990 | Waldo | |
| 4,947,028 A | 8/1990 | Gorog | |
| 4,959,686 A | 9/1990 | Spallone et al. | |
| 4,967,403 A | 10/1990 | Ogawa et al. | |
| 4,967,906 A | 11/1990 | Morello et al. | |
| 4,982,346 A | 1/1991 | Girouard et al. | |
| 4,991,739 A | 2/1991 | Levasseur | |
| 4,995,498 A | 2/1991 | Menke | |
| 5,007,518 A | 4/1991 | Crooks et al. | |
| 5,012,077 A | 4/1991 | Takano | |
| 5,013,897 A | 5/1991 | Harman et al. | |
| 5,019,699 A | 5/1991 | Koenck | |
| 5,020,652 A * | 6/1991 | Seiriki | 194/229 |
| 5,020,958 A * | 6/1991 | Tuttobene | 414/281 |
| 5,028,766 A | 7/1991 | Shah | |
| 5,042,686 A | 8/1991 | Stucki | |
| 5,077,462 A | 12/1991 | Newell et al. | |
| 5,077,607 A | 12/1991 | Johnson et al. | |
| 5,085,308 A | 2/1992 | Wilhelm | |
| 5,088,586 A | 2/1992 | Isobe et al. | |
| 5,091,713 A | 2/1992 | Horne et al. | |
| 5,095,195 A | 3/1992 | Harman et al. | |
| 5,105,069 A | 4/1992 | Hakenewerth et al. | |
| 5,128,862 A | 7/1992 | Mueller | |
| 5,133,441 A | 7/1992 | Brown | |
| 5,139,384 A | 8/1992 | Tuttobene | |
| 5,143,193 A | 9/1992 | Geraci | |
| 5,159,560 A * | 10/1992 | Newell et al. | 700/215 |
| 5,205,436 A | 4/1993 | Savage | |
| 5,206,814 A | 4/1993 | Cahlander et al. | |
| 5,207,784 A | 5/1993 | Schwartzendruber | |
| 5,212,649 A | 5/1993 | Pelletier et al. | |
| 5,226,519 A * | 7/1993 | DeWoolfson | 194/209 |
| 5,235,509 A | 8/1993 | Mueller et al. | |
| RE34,369 E | 9/1993 | Darden et al. | |
| 5,273,183 A | 12/1993 | Tuttobene | |
| 5,313,392 A | 5/1994 | Temma et al. | |
| 5,313,393 A | 5/1994 | Varley et al. | |
| 5,319,705 A | 6/1994 | Halter et al. | |
| 5,323,327 A | 6/1994 | Carmichael et al. | |
| 5,335,818 A * | 8/1994 | Maldanis et al. | 221/131 |
| 5,353,219 A | 10/1994 | Mueller et al. | |
| 5,383,111 A | 1/1995 | Homma et al. | |
| 5,385,265 A | 1/1995 | Schlamp | |
| 5,402,911 A * | 4/1995 | Noell | 221/81 |
| 5,408,417 A | 4/1995 | Wilder | |
| 5,409,092 A | 4/1995 | Itako et al. | |
| 5,418,713 A | 5/1995 | Allen | |
| 5,442,568 A | 8/1995 | Ostendorf et al. | |
| 5,445,295 A | 8/1995 | Brown | |
| 5,450,584 A | 9/1995 | Sekiguchi et al. | |
| 5,450,938 A | 9/1995 | Rademacher | |
| 5,467,892 A | 11/1995 | Schlamp | |
| 5,482,139 A | 1/1996 | Rivalto | |
| 5,484,988 A | 1/1996 | Hills et al. | |

(56) References Cited

U.S. PATENT DOCUMENTS

| | | | |
|---|---|---|---|
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,561,604 A | 10/1996 | Buckley et al. |
| 5,576,951 A | 11/1996 | Lockwood |
| 5,594,791 A | 1/1997 | Szlam et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls |
| 5,638,985 A * | 6/1997 | Fitzgerald et al. ............ 221/125 |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan |
| 5,715,403 A | 2/1998 | Stefik et al. |
| 5,724,069 A | 3/1998 | Chen |
| 5,724,521 A | 3/1998 | Dedrick |
| 5,732,398 A | 3/1998 | Tagawa |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs |
| 5,769,269 A | 6/1998 | Peters |
| 5,777,884 A | 7/1998 | Belka et al. |
| H1743 H | 8/1998 | Graves et al. |
| 5,790,677 A | 8/1998 | Fox et al. |
| 5,794,816 A * | 8/1998 | Pliler et al. ............ 221/203 |
| 5,806,071 A | 9/1998 | Balderrama et al. |
| 5,822,216 A | 10/1998 | Satchell, Jr. et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell |
| 5,898,594 A | 4/1999 | Leason et al. |
| 5,900,608 A | 5/1999 | Iida |
| 5,905,246 A | 5/1999 | Fajkowski |
| 5,923,016 A | 7/1999 | Fredregill et al. |
| 5,930,771 A | 7/1999 | Stapp |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,941,414 A * | 8/1999 | Kasper ............ 221/210 |
| 5,943,423 A | 8/1999 | Muftic |
| 5,950,173 A | 9/1999 | Perkowski |
| 5,954,797 A | 9/1999 | Sidey |
| 5,956,694 A | 9/1999 | Powell |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott |
| 5,988,346 A | 11/1999 | Tedesco et al. |
| 5,988,431 A | 11/1999 | Roe |
| 5,997,170 A | 12/1999 | Brodbeck |
| 6,002,395 A | 12/1999 | Wagner et al. |
| 6,010,239 A | 1/2000 | Hardgrave et al. |
| 6,014,137 A | 1/2000 | Burns |
| 6,029,851 A * | 2/2000 | Jenkins et al. ............ 221/102 |
| 6,039,244 A | 3/2000 | Finsterwald |
| 6,044,362 A | 3/2000 | Neely |
| 6,047,338 A | 4/2000 | Grolemund |
| 6,050,448 A | 4/2000 | Willis |
| 6,056,150 A * | 5/2000 | Kasper ............ 221/21 |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata |
| 6,119,934 A | 9/2000 | Kolls |
| 6,123,223 A | 9/2000 | Watkins |
| 6,125,353 A | 9/2000 | Yagasaki |
| 6,126,036 A | 10/2000 | D'Alayer De Costemore D'Arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,161 B1 * | 1/2001 | Kovens et al. ............ 221/131 |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross et al. |
| 6,477,503 B1 | 11/2002 | Mankes |
| 6,490,502 B2 | 12/2002 | Fellows et al. |
| 6,493,110 B1 | 12/2002 | Roberts |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |

(56) References Cited

U.S. PATENT DOCUMENTS

| | | | |
|---|---|---|---|
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair, III et al. |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | DeLapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollstrom et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 | 8/2006 | VanOrman |
| 7,101,139 B1 * | 9/2006 | Benedict ............... 414/281 |
| 7,108,180 B2 | 9/2006 | Brusso et al. |
| 7,139,731 B1 | 11/2006 | Alvin |
| 7,167,842 B1 | 1/2007 | Josephson, II et al. |
| 7,167,892 B2 | 1/2007 | Defosse et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,233,916 B2 | 6/2007 | Schultz |
| 7,234,609 B2 | 6/2007 | DeLazzer et al. |
| 7,236,942 B1 * | 6/2007 | Walker et al. ............. 705/14.65 |
| 7,236,946 B2 | 6/2007 | Bates et al. |
| 7,240,805 B2 | 7/2007 | Chirnomas |
| 7,240,843 B2 | 7/2007 | Paul et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 | 9/2009 | DeLazzer et al. |
| 7,747,346 B2 | 6/2010 | Lowe et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,853,354 B2 | 12/2010 | Kuehnrich et al. |
| 7,853,600 B2 | 12/2010 | Herz et al. |
| 7,860,606 B2 | 12/2010 | Rudy |
| 7,988,049 B2 | 8/2011 | Kuehnrich |
| 8,060,249 B2 | 11/2011 | Bear et al. |
| 8,234,207 B2 * | 7/2012 | Breitenbach et al. ............ 705/37 |
| 8,235,247 B2 | 8/2012 | Alvarez |
| 8,306,908 B1 * | 11/2012 | Barker et al. .................... 705/38 |
| 8,352,449 B1 | 1/2013 | Parekh et al. |
| 8,600,899 B1 * | 12/2013 | Davis ............... 705/75 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 * | 9/2002 | Jenkins et al. ............... 235/383 |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0030539 A1 * | 2/2003 | McGarry et al. ............. 340/5.9 |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149673 A1 | 8/2003 | Takahashi |
| 2003/0154141 A1 * | 8/2003 | Capazario et al. ............... 705/27 |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 | 4/2004 | Messenger et al. |
| 2004/0133466 A1 | 7/2004 | Redmond et al. |
| 2004/0133653 A1 | 7/2004 | Defosse et al. |
| 2004/0153413 A1 | 8/2004 | Gross |
| 2004/0158503 A1 | 8/2004 | Gross |
| 2004/0158504 A1 | 8/2004 | Gross |
| 2004/0158871 A1 | 8/2004 | Jacobson |
| 2004/0162633 A1 | 8/2004 | Kraft et al. |
| 2004/0162783 A1 | 8/2004 | Gross |
| 2004/0172274 A1 | 9/2004 | Gross |
| 2004/0172275 A1 | 9/2004 | Gross |

(56) References Cited

U.S. PATENT DOCUMENTS

| | | |
|---|---|---|
| 2004/0172342 A1 | 9/2004 | Gross |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0192705 A1 | 9/2005 | Pinney et al. |
| 2005/0197855 A1 | 9/2005 | Nudd et al. |
| 2005/0216120 A1 | 9/2005 | Rosenberg et al. |
| 2005/0230410 A1 | 10/2005 | DeLazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0045660 A1* | 3/2006 | Di Rosa ............... 414/139.9 |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0136091 A1* | 6/2006 | Browne ............... 700/213 |
| 2006/0136095 A1 | 6/2006 | Rob et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1* | 11/2006 | Hoersten ............... 186/52 |
| 2006/0259190 A1 | 11/2006 | Hale |
| 2006/0259191 A1 | 11/2006 | Lowe |
| 2006/0259192 A1 | 11/2006 | Lowe et al. |
| 2006/0265101 A1 | 11/2006 | Kaplan et al. |
| 2006/0265286 A1 | 11/2006 | Evangelist et al. |
| 2006/0266823 A1 | 11/2006 | Passen et al. |
| 2006/0272922 A1 | 12/2006 | Hoersten et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0063020 A1 | 3/2007 | Barrafato |
| 2007/0063027 A1 | 3/2007 | Belfer et al. |
| 2007/0067429 A1 | 3/2007 | Jain et al. |
| 2007/0084872 A1 | 4/2007 | Hair, III et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0215697 A1* | 9/2007 | Ward et al. .............. 235/380 |
| 2007/0276537 A1 | 11/2007 | Walker et al. |
| 2008/0005025 A1 | 1/2008 | Legere et al. |
| 2008/0027835 A1 | 1/2008 | LeMasters et al. |
| 2008/0040211 A1 | 2/2008 | Walker et al. |
| 2008/0116262 A1* | 5/2008 | Majer .............. 235/381 |
| 2008/0125906 A1 | 5/2008 | Bates et al. |
| 2008/0131255 A1* | 6/2008 | Hessler et al. ........... 414/788.1 |
| 2008/0222690 A1 | 9/2008 | Kim |
| 2008/0239961 A1 | 10/2008 | Hilerio et al. |
| 2008/0249658 A1 | 10/2008 | Walker et al. |
| 2008/0275591 A1 | 11/2008 | Chirnomas et al. |
| 2008/0313973 A1* | 12/2008 | Butler Rolf ............. 52/79.1 |
| 2009/0018792 A1 | 1/2009 | Kuehnrich |
| 2009/0030931 A1 | 1/2009 | Khivesara et al. |
| 2009/0048932 A1 | 2/2009 | Barber |
| 2009/0089187 A1 | 4/2009 | Hoersten et al. |
| 2009/0113116 A1 | 4/2009 | Thompson et al. |
| 2009/0299824 A1 | 12/2009 | Barnes, Jr. |
| 2009/0326708 A1 | 12/2009 | Rudy et al. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0057871 A1 | 3/2010 | Kaplan et al. |
| 2010/0127013 A1 | 5/2010 | Butler |
| 2010/0153983 A1 | 6/2010 | Philmon et al. |
| 2010/0198400 A1 | 8/2010 | Pascal et al. |
| 2010/0274624 A1 | 10/2010 | Rochford et al. |
| 2010/0296908 A1* | 11/2010 | Ko ................ 414/800 |
| 2010/0300041 A1 | 12/2010 | Kim |
| 2010/0312380 A1 | 12/2010 | Lowe et al. |
| 2010/0314405 A1 | 12/2010 | Alvarez |
| 2010/0316468 A1* | 12/2010 | Lert et al. .............. 414/273 |
| 2010/0318219 A1 | 12/2010 | Kuehnrich et al. |
| 2011/0004536 A1 | 1/2011 | Hoersten et al. |
| 2011/0047010 A1 | 2/2011 | Arnold et al. |
| 2011/0060454 A1 | 3/2011 | Lowe et al. |
| 2011/0060456 A1 | 3/2011 | Lowe et al. |
| 2011/0093329 A1 | 4/2011 | Bodor et al. |
| 2011/0103609 A1 | 5/2011 | Pelland et al. |
| 2011/0130873 A1 | 6/2011 | Yepez et al. |
| 2011/0131652 A1 | 6/2011 | Robinson et al. |
| 2011/0145033 A1 | 6/2011 | Kuehnrich et al. |
| 2011/0153060 A1 | 6/2011 | Yepez et al. |
| 2011/0153067 A1 | 6/2011 | Weinshenker |
| 2011/0153071 A1 | 6/2011 | Claessen |
| 2011/0238194 A1 | 9/2011 | Rosenberg |
| 2011/0238296 A1 | 9/2011 | Purks et al. |
| 2012/0059511 A1* | 3/2012 | Majer .............. 700/231 |
| 2012/0123587 A1 | 5/2012 | Mockus et al. |
| 2012/0310409 A1 | 12/2012 | Breitenbach et al. ......... 700/237 |
| 2012/0311633 A1 | 12/2012 | Mandrekar et al. |
| 2012/0330458 A1* | 12/2012 | Weiss .............. 700/216 |
| 2013/0046707 A1 | 2/2013 | Maskatia et al. |
| 2013/0060648 A1 | 3/2013 | Maskatia et al. |
| 2013/0117137 A1* | 5/2013 | Klein et al. ............. 705/16 |
| 2013/0238115 A1 | 9/2013 | Smith et al. |
| 2013/0310970 A1 | 11/2013 | Segal et al. |

(56) References Cited

U.S. PATENT DOCUMENTS

FOREIGN PATENT DOCUMENTS

| | | | |
|---|---|---|---|
| CA | 2604730 | A1 | 3/2009 |
| DE | 3529155 | A1 | 2/1987 |
| EP | 0060643 | A2 | 9/1982 |
| EP | 0205691 | A1 | 12/1986 |
| EP | 0249367 | A2 | 12/1987 |
| EP | 0287367 | A1 | 10/1988 |
| EP | 0572119 | A2 | 12/1993 |
| EP | 0986033 | A2 | 3/2000 |
| EP | 1367549 | A1 | 12/2003 |
| FR | 2549624 | A1 | 1/1985 |
| FR | 2559599 | A1 | 8/1985 |
| FR | 2562293 | A1 | 10/1985 |
| GB | 380926 | A | 9/1932 |
| GB | 2143662 | A | 2/1985 |
| GB | 2172720 | A | 9/1986 |
| GB | 2402242 | A | 12/2004 |
| JP | S55156107 | A | 12/1980 |
| JP | S5647855 | A | 4/1981 |
| JP | H02178795 | A | 7/1990 |
| JP | H0362189 | A | 3/1991 |
| JP | H03119496 | A | 5/1991 |
| JP | H10247982 | A | 9/1998 |
| JP | 2000149136 | A | 5/2000 |
| JP | 2003036328 | A | 2/2003 |
| JP | 2004094857 | A | 3/2004 |
| JP | 2009043143 | A | 2/2009 |
| KR | 20030089154 | A | 11/2003 |
| KR | 20040069053 | A | 8/2004 |
| KR | 20060080175 | A | 7/2006 |
| KR | 20060114658 | A | 11/2006 |
| KR | 20070021301 | A | 2/2007 |
| WO | 8700948 | A1 | 2/1987 |
| WO | 8705425 | A1 | 9/1987 |
| WO | 8804085 | A1 | 6/1988 |
| WO | 8806771 | A1 | 9/1988 |
| WO | 9300644 | A1 | 1/1993 |
| WO | 9847799 | A1 | 10/1998 |
| WO | 9924902 | A1 | 5/1999 |
| WO | 0038120 | A1 | 6/2000 |
| WO | 0072160 | A1 | 11/2000 |
| WO | 0225552 | A2 | 3/2002 |
| WO | 0229708 | A1 | 4/2002 |
| WO | 2004070646 | A2 | 8/2004 |
| WO | 2005009324 | A2 | 2/2005 |
| WO | 2005062887 | A2 | 7/2005 |
| WO | 2006112817 | A1 | 10/2006 |
| WO | 2006116108 | A2 | 11/2006 |
| WO | 2006116109 | A2 | 11/2006 |
| WO | 2006116110 | A2 | 11/2006 |
| WO | 2006116112 | A1 | 11/2006 |
| WO | 2006116113 | A2 | 11/2006 |
| WO | 2006116114 | A2 | 11/2006 |
| WO | 2006116115 | A2 | 11/2006 |
| WO | 2006116116 | A2 | 11/2006 |
| WO | 2008131548 | A1 | 11/2008 |
| WO | 2005009324 | A3 | 4/2009 |
| WO | 2010048375 | A1 | 4/2010 |
| WO | 2011022689 | A2 | 2/2011 |
| WO | 2011028727 | A2 | 3/2011 |
| WO | 2011028728 | A2 | 3/2011 |
| WO | 2011031532 | A2 | 3/2011 |
| WO | 2011028727 | A3 | 6/2011 |

OTHER PUBLICATIONS

A complete version of U.S. Appl. No. 61/501,026 dated Jun. 24, 2011 is presented as a part of this office action. Publication No. 2012/0330458 A1 takes a priority to this provisional application.
Canadian Office Action for Canadian Patent Application No. 2604730, mailed on Aug. 27, 2015.
European Search Report for Application No. EP1280399, mailed on Aug. 19, 2015, 8 pages.
European Search Report for Application No. EP13758390.2, mailed on Oct. 8, 2015, 9 pages.
Examination Report for EP 05736275.8, mailed on May 15, 2009.
International Preliminary Report on Patentability for Application No. PCT/US2005/12563, mailed on Apr. 7, 2006, 3 pages.
International Preliminary Report on Patentability for Application No. PCT/US2006/15125, mailed on Jan. 11, 2007, 4 pages.
International Preliminary Report on Patentability for Application No. PCT/US2006/15126, mailed on Apr. 3, 2008, 6 pages.
International Preliminary Report on Patentability for Application No. PCT/US2006/15127, mailed on Jun. 19, 2008, 4 pages.
International Preliminary Report on Patentability for Application No. PCT/US2006/15129, mailed on Sep. 20, 2006, 4 pages.
International Preliminary Report on Patentability for Application No. PCT/US2006/15130, mailed on Apr. 23, 2007, 56 pages.
International Preliminary Report on Patentability for Application No. PCT/US2006/15131, mailed on Jul. 7, 2008, 4 pages.
International Preliminary Report on Patentability for Application No. PCT/US2006/15132, mailed on Nov. 16, 2007, 4 pages.
International Preliminary Report on Patentability for Application No. PCT/US2006/15133, mailed on Jun. 6, 2007, 4 pages.
International Preliminary Report on Patentability for Application No. PCT/US2010/046219, mailed on Feb. 28, 2011, 6 pages.
International Preliminary Report on Patentability for Application No. PCT/US2010/046872, mailed on Sep. 7, 2011, 14 pages.
International Preliminary Report on Patentability for Application No. PCT/US2010/047371, mailed on Apr. 29, 2011, 7 pages.
International Preliminary Report on Patentability for Application No. PCT/US2010/047374, mailed on May 2, 2011, 7 pages.
International Preliminary Report on Patentability for Application No. PCT/US2010/050339, mailed on Apr. 12, 2012, 9 pages.
International Preliminary Report on Patentability for Application No. PCT/US2011/48686, mailed on Mar. 7, 2013, 6 pages.
International Preliminary Report on Patentability for Application No. PCT/US2012/024900, mailed on Aug. 29, 2013, 6 pages.
International Search Report and Written Opinion for Application No. PCT/US2006/015127, mailed on Jun. 19, 2008, 4 pages.
International Search Report and Written Opinion for Application No. PCT/US2006/015129, mailed on Sep. 20, 2006, 4 pages.
International Search Report and Written Opinion for Application No. PCT/US2006/015130, mailed on Nov. 22, 2006, 4 pages.
International Search Report and Written Opinion for Application No. PCT/US2006/015131, mailed on Jul. 7, 2008, 4 pages.
International Search Report and Written Opinion for Application No. PCT/US2006/015132, mailed on May 10, 2007, 4 pages.
International Search Report and Written Opinion for Application No. PCT/US2006/015133, mailed on Jun. 6, 2007, 4 pages.
International Search Report and Written Opinion for Application No. PCT/US2010/046219, mailed on Feb. 28, 2011, 10 pages.
International Search Report and Written Opinion for Application No. PCT/US2010/046872, mailed on Mar. 29, 2011, 7 pages.
International Search Report and Written Opinion for Application No. PCT/US2010/047371, mailed on Apr. 29, 2011, 9 pages.
International Search Report and Written Opinion for Application No. PCT/US2010/047374, mailed on May 2, 2011, 9 pages.
International Search Report and Written Opinion for Application No. PCT/US2011/050339, mailed on Feb. 29, 2012, 8 pages.
International Search Report and Written Opinion for Application No. PCT/US2013/029414, mailed on Jun. 26, 2013, 7 pages.
International Search Report and Written Opinion for Application No. PCT/US2013/029424, mailed on Jun. 21, 2013, 9 pages.
International Search Report and Written Opinion for Application No. PCT/US2013/029443, mailed on Jun. 21, 2013, 13 pages.
International Search Report for Application No. PCT/US06/015129, mailed on Sep. 20, 2006, 1 page.
International Search Report for Application No. PCT/US06/15130, mailed on Nov. 22, 2006, 1 page.
International Search Report for Application No. PCT/US06/15132, mailed on May 10, 2007, 1 page.
International Search Report for Application No. PCT/US06/15133, mailed on Jun. 6, 2007, 1 page.
International Search Report for Application No. PCT/US2005/12563, mailed on Aug. 10, 2005, 1 page.

(56) References Cited

OTHER PUBLICATIONS

International Search Report for Application No. PCT/US2006/15125, mailed on Jan. 11, 2007, 1 page.
International Search Report for Application No. PCT/US2006/15126, mailed on Apr. 3, 2008, 1 page.
International Search Report for Application No. PCT/US2010/047371 mailed on Apr. 29, 2011, 3 pages.
International Search Report for Application No. PCT/US2010/050339 mailed on Dec. 13, 2010, 5 pages.
International Search Report for Application No. PCT/US2011/48686 mailed on Apr. 9, 2012, 5 pages.
International Search Report for Application No. PCT/US2012/024900 mailed on Oct. 19, 2012, 4 pages.
International Search Report for Application No. PCT/US2012/42329 mailed on Feb. 22, 2013, 13 pages.
Issue Rolling Stones Magazine, Film Rentals by Vending Machine, 1982.
Picture of U.S. Installation of Japanese Manufactured VHS Rental Kiosk, 1984.
Supplemental European Search Report for Application No. EP05736275 mailed on Jan. 21,2009, 2 pages.
Technophobe's best friend by MaClatchy, Smith Erika, McClatchy-Tribune Business news Oct. 22, 2007.

* cited by examiner

SYSTEM AND METHOD FOR OPTIMIZING UTILIZATION OF INVENTORY SPACE FOR DISPENSABLE ARTICLES

CROSS-REFERENCE TO RELATED APPLICATIONS

This application is a continuation application of U.S. patent application Ser. No. 13/414,612, filed Mar. 7, 2012, entitled "SYSTEM AND METHOD FOR OPTIMIZING UTILIZATION OF INVENTORY SPACE FOR DISPENSABLE ARTICLES," and is incorporated by reference herein. This application is also related to U.S. patent application Ser. No. 13/414,612, filed Mar. 7, 2012, entitled "SYSTEM AND METHOD FOR OPTIMIZING UTILIZATION OF INVENTORY SPACE FOR DISPENSABLE ARTICLES," and is incorporated by reference herein.

TECHNICAL FIELD

This invention relates to a system and method for optimizing utilization of inventory space for articles dispensable from an article dispensing machine. More particularly, the invention provides a system and method for managing the removal and loading of articles to a storage unit, a merchandising zone, and/or an article removal bin of the article dispensing machine.

BACKGROUND AND SUMMARY OF THE INVENTION

While the invention is often described herein with reference to a digital video disc, Blu-Ray disc, and video game distribution system, an application to which the invention is advantageously suited, it will be readily apparent that the invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the invention can function as an article dispensing machine-based distribution system that will typically have multiple units of each new release per article dispensing machine. The dispensing machines of the U.S. Pat. No. 7,234,609 and the invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours (e.g., 24 hours a day, 7 days a week). The invention employs a more cost-effective, convenient platform than brick-and-mortar stores. In addition, with the invention, dispensing machines can be situated in retail locations having high foot traffic, such as at a popular grocery store, restaurant, drug store, and/or other popular retail location.

The dispensing machine of the U.S. Pat. No. 7,234,609 and the invention can be operated at a substantial savings over the costs associated with traditional brick-and-mortar video rental stores. For example, the invention does not require hourly employees to continuously man the dispensing machines or restock them with inventories.

Unlike brick-and-mortar stores, the dispensing machine of the U.S. Pat. No. 7,234,609 and the invention does not require an on-site store manager because all operational decisions can be made at a centralized location by a management team officed remote from the retail locations. Unlike brick-and-mortar stores, the dispensing machine of the U.S. Pat. No. 7,234,609 and the invention does not require significant physical space. Unlike brick-and-mortar stores, the dispensing machine of the U.S. Pat. No. 7,234,609 and the invention has low operating costs because heating or air conditioning is not necessarily required for the dispensing machines and they consume a relatively low level of electrical energy. In addition, the dispensing machine of the U.S. Pat. No. 7,234,609 has low maintenance costs and downtime.

The dispensing machine of the U.S. Pat. No. 7,234,609 and the invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application. These technologies and others fill long-felt needs in the art and give advantages over conventional video distribution options. The dispensing machine of the U.S. Pat. No. 7,234,609 and the invention functions as much as a promotional platform as it does a rental kiosk.

By utilizing the dispensing machines and the fully-interactive, real-time, linked Internet website or mobile/consumer electronics device applications, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

The invention allows for optimizing the utilization of inventory space for articles dispensable from an article dispensing machine by improving the sorting, removal, and loading of the inventory of articles. A list identifying a subset of articles targeted for removal from the article dispensing machine may be received. The subset of articles may include at least thinned articles, damaged articles, fraudulent articles, do not rent (DNR) articles, rebalancing articles, and/or a combination of these subsets that are to be removed from the article dispensing machine. Further refined subsets of a subset of articles may also be defined. The subset of articles may be moved from a non-removable storage unit in the article dispensing machine to a predetermined area. The predetermined area may include a merchandising zone of the storage unit and/or a separate article removal bin. Inventory management may then be initiated through the receipt of a command from a field service representative. The field service representative may remove each subset of articles from the predetermined area(s) and confirm that the subset of articles was removed. New articles may be loaded into the predetermined area by the field service representative, followed by confirmation that the new articles have been loaded. The article dispensing machine may move the new articles from the predetermined area to the storage unit. The status of each of the articles may be tracked in an inventory database.

The invention has the advantage of quicker and more efficient removal from and loading of articles to an article dispensing machine because the articles may be removed from and loaded to the same predetermined area. Moreover, the wear and tear on mechanics of the article dispensing machine and downtime due to mechanical breakdowns may be reduced through use of the invention. Cost savings due to less downtime, maintenance, and time for removing and loading articles may also result. Other features and advantages are provided by the following description and drawings.

DETAILED DESCRIPTION OF THE INVENTION

Figure 1:
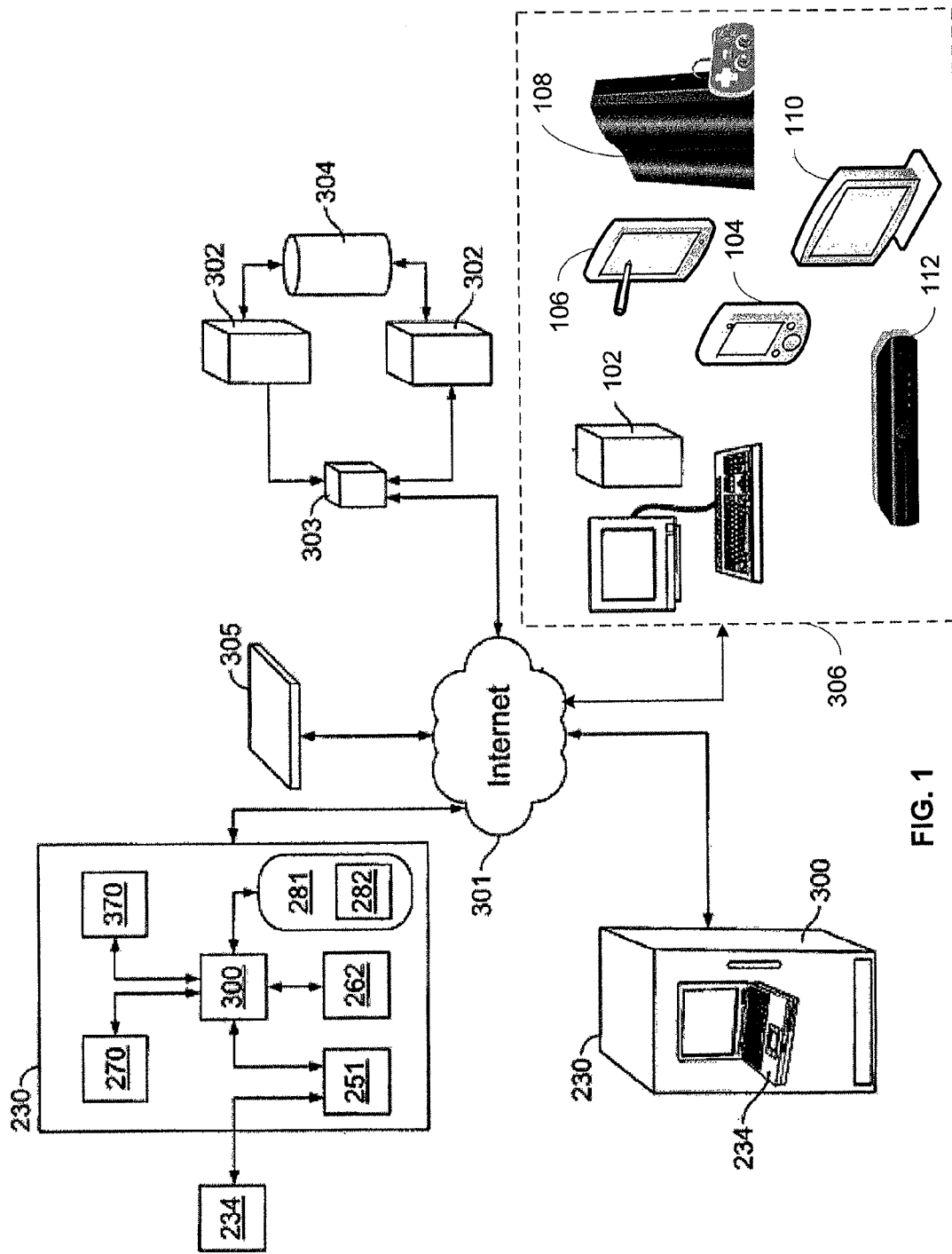
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIGS. 1-5 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Generally, in terms of hardware architecture, the central server 302 includes a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the invention and the O/S, in whole or in part, but typically the latter, are read by processor, perhaps buffered within the processor, and then executed.

When the invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the invention is for article dispensing machine 230 to have a "broadband" connection to the network 301, the principles of the invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 is preferably a relational database, although other types of database architectures may be used without departing from the principles of the invention. For example, the database 304 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304. In one embodiment, .net and Microsoft Reporting Services are employed, however, other technologies such as ODBC, MySQL, CFML and the like may be used.

The central controller 302 and central database 304 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302 and/or the central database 304 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302 and the central database 304 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

Figure 2:
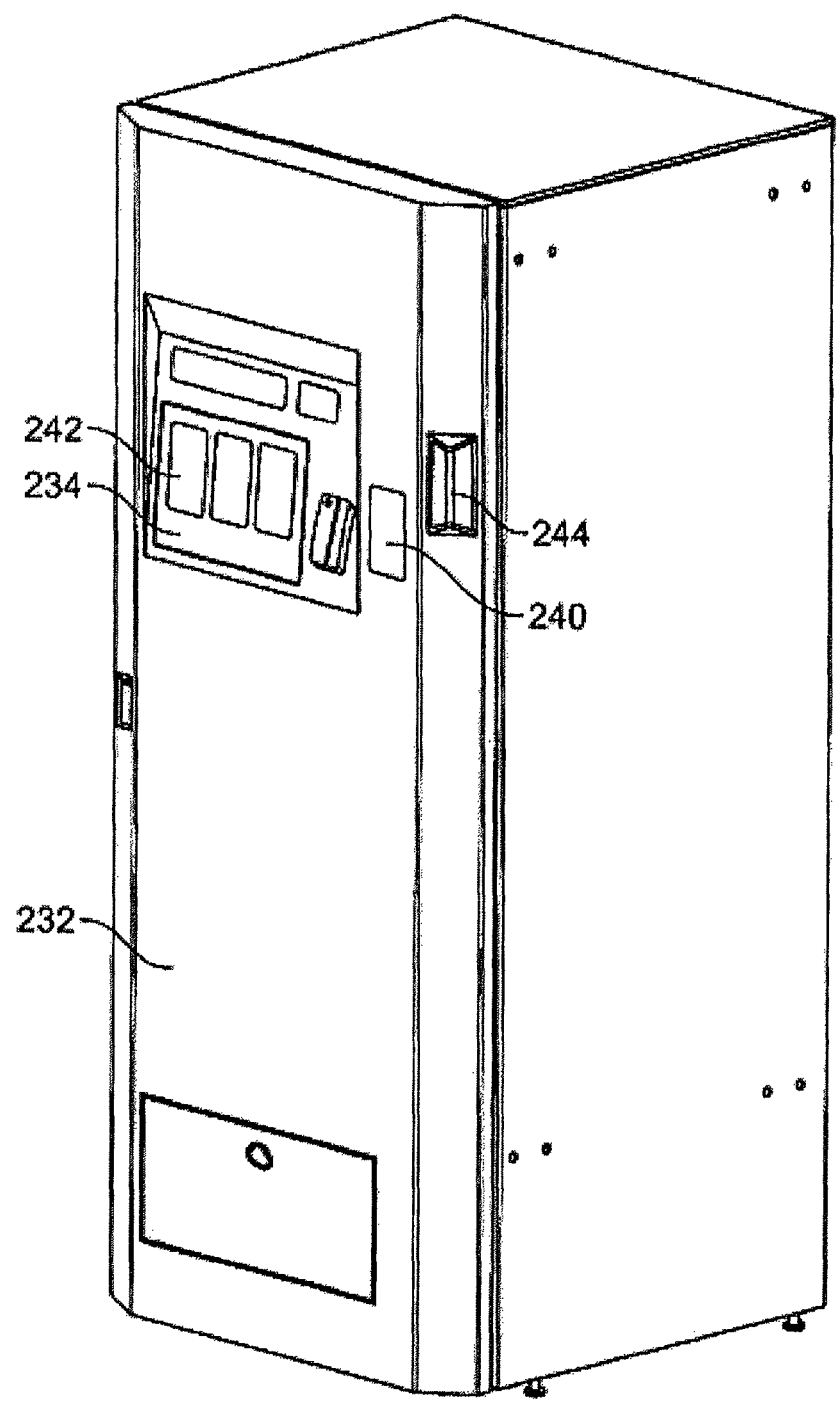
FIG. 2 is a perspective view of an article dispensing machine constructed in accordance with the principles of the invention.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection or can represent a reference number for use by the customer when contacting customer service, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

Figure 3:
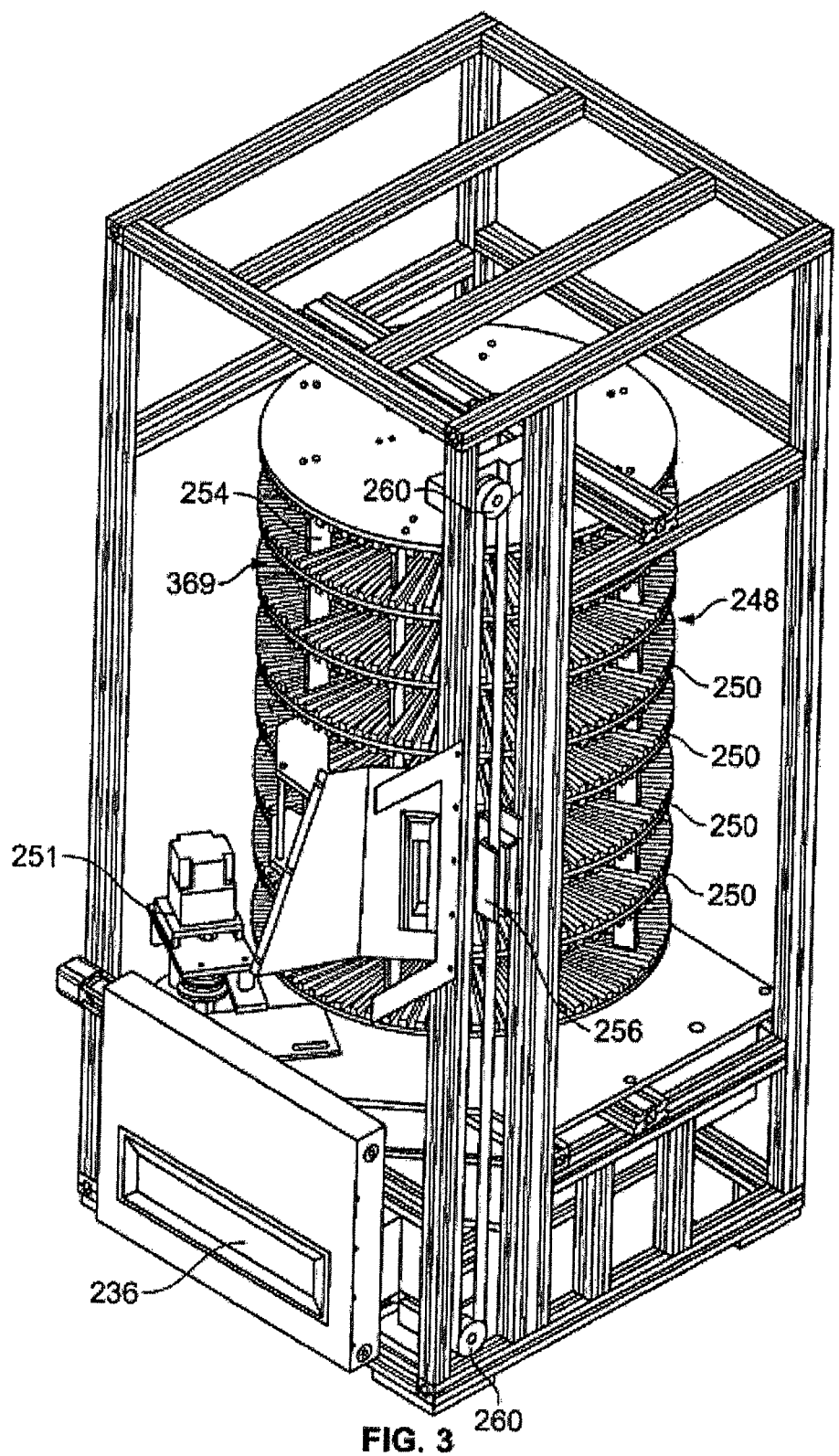
FIG. 3 is a partially open perspective view of the article dispensing machine of FIG. 2.

Referring now to FIG. 3 which shows the components positioned in the interior of dispensing machine 230, the article dispensing machine includes a non-removable storage unit 248 which may be a carousel-style, cylindrical storage facility having a plurality of compartmentalized rows 249 defined by circular-shaped storage racks 250 sharing a common central axis. Each of the rows 249 has a plurality of receiving slots or compartments 369. Each storage rack 250 includes radially extending, angularly separated compartment panels defining article storage compartments 369 which are designed to receive and retain flat-type pack articles, such as DVD, Blu-Ray disc, and video game disc cases, as desired. The compartment panels are preferably axially aligned to retain the opposing sides of DVD, Blu-Ray disc, and video game disc cases at the top and bottom ends thereof. In that regard, the DVD, Blu-Ray disc, and video game disc cases are preferably retained between successive vertical pairs of storage racks 250. The storage racks 250 are vertically spaced by axially extending support members 254.

Figure 4:
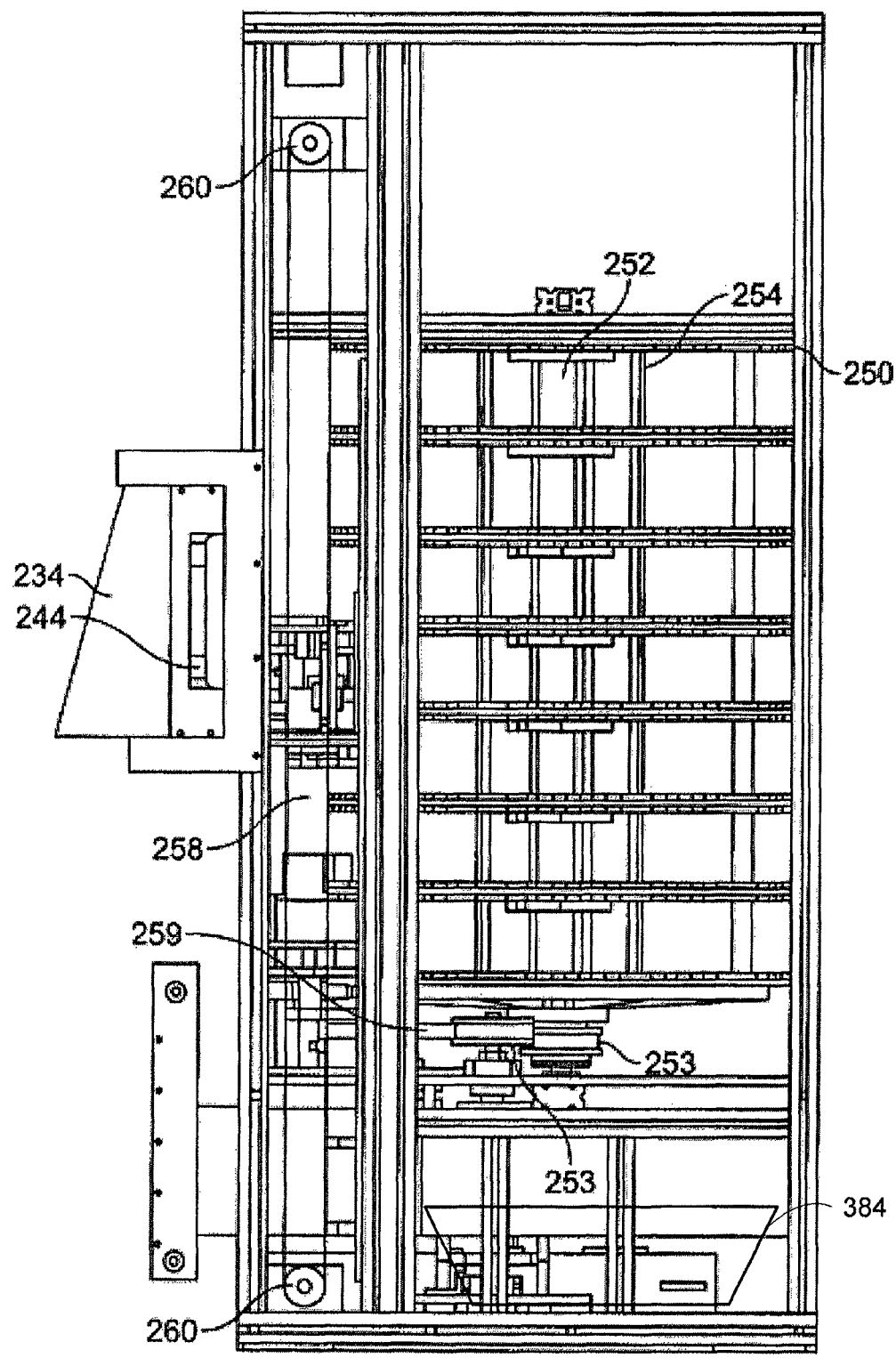
FIG. 4 is a partially open side elevational view of the article dispensing machine of FIG. 2.

A first motor 251, hereinafter referred to as the rotational motor, rotates the storage unit 248 about a vertical axis formed by the driven shaft 252. As shown in FIG. 4, rotational motor 251 drives a belt 259, which in turn rotates wheels 253 and shaft 252 to which the storage racks 250 are attached.

Figure 5:
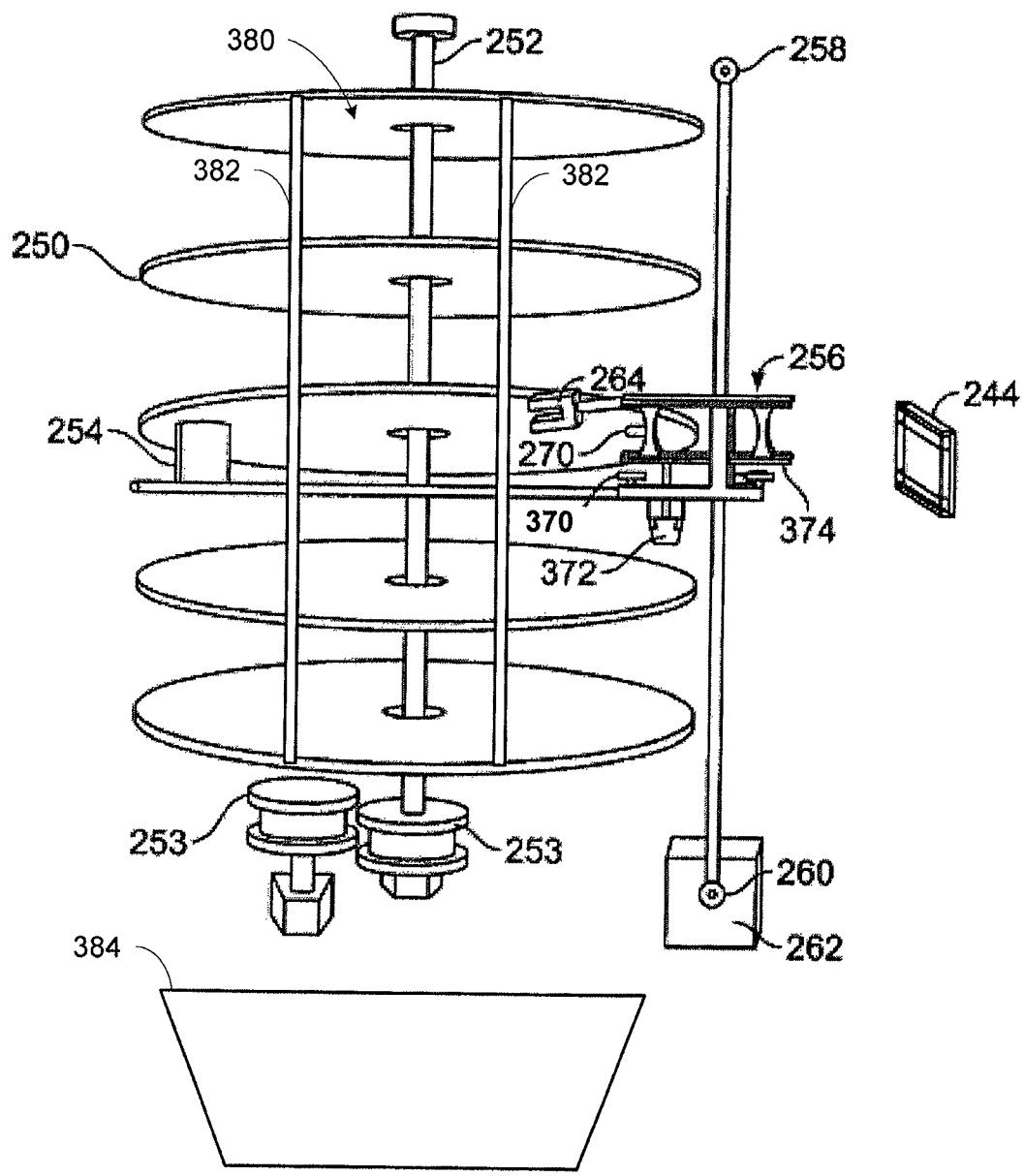
FIG. 5 is a partially open side elevational view of the view of the article dispensing machine of FIG. 2 with certain components removed for clarity.

As shown in FIGS. 3 and 5, a selector arm 256 is adjacent the storage unit 248. The selector arm 256 is connected to a conveying belt 258 carried by rollers 260, which are preferably positioned proximate to the top and the bottom of the article dispensing machine housing. At least one of the rollers 260 may be driven by a second motor 262, hereinafter referred to as the selector arm motor, to provide for vertical movement of selector arm 256 along a vertical axis generally parallel to the vertical axis of the storage device. Alternatively, the selector arm motor 262 may be positioned on the selector arm 256. In a preferred embodiment, the motors 251, 262 are stepper motors that are capable of accurately controlling the movement and position of the compartmentalized storage unit 248 and the selector arm 256, respectively.

Referring now to FIG. 5, the vending apparatus 230 is equipped with a first sensor 270 for sensing objects stored in the inventory of the apparatus. The first sensor is preferably mounted on the selector arm 256. A variety of forms of sensors are practicable with the invention for use as the first sensor without departing from the principles thereof, including proximity sensors, proximity sensors, an optical laser scanner, a magnetic scanner, an optical bar code reader, an ultraviolet optical scanner, a radio frequency sensor and an infrared optical scanner. The vending apparatus 230 is further equipped with a second sensor 370 capable of reading information attached to the objects stored in the inventory of the apparatus. The second sensor 370 is preferably, as illustrated, mounted on the selector arm 256. A variety of forms of sensors are practicable with the invention for use as the second sensor without departing from the principles thereof, including an optical laser scanner, a magnetic scanner, an optical bar code reader, an ultraviolet optical scanner, a radio frequency sensor and an infrared optical scanner.

The selector arm 256 comprises a picker device 264 which is capable of removing a DVD, Blu-Ray disc, or video game disc from the compartments 369. The selector arm 256 may further comprise a conveyor belt 374, which contacts one of the media products in one of the compartments 369 and conveys the product to the article transfer opening 244 whereby it is delivered to a user on the exterior of the article dispensing machine 230. The conveyor 374 is driven by a conveyor motor 372.

A system and method for calibrating the selector arm controller is disclosed in commonly owned U.S. Patent Application, Publication No. 2006/0254832, which is herein incorporated by reference in its entirety.

Generally, during the normal operation of the article dispensing machine, each article of inventory dispensed from a dispensing machine is preferably scanned by the second sensor 370 and an electronic record is created indicating the consumer who rented and/or purchased the media. In addition, articles of inventory returned to a dispensing machine by a customer and inserted into the article transfer opening 244 thereof are preferably scanned by the second sensor 370 and identified by the dispensing machine (for example with a bar code reader or scanner in electronic communication with the dispensing machine controller, positioned proximate the media dispensing/return opening) along with an identification of its later stored position on the storage device.

These electronic records can be shared among dispensing machines within a network thereof, and can also be shared with a centralized office via the Internet or any other electronic data communication link. These electronic records can be used to ensure that the inventory process is carried out efficiently and accurately.

Part of the storage unit 248 may be designated as a merchandising zone 380 for implementing the invention related to optimizing utilization of inventory space of the article dispensing machine 230, as described below. A predetermined number of article storage compartments 369 in each of the storage racks 250 that make up the storage unit 248 may be part of the merchandising zone 380. Color-coded rods 382, in one embodiment, may delineate the merchandising zone 380 so that inventory stocking personnel and/or field service representatives can quickly and easily identify the merchandising zone 380. Other locators and/or indicators may be utilized to identify and define the merchandising zone 380. The merchandising zone 380 may hold articles that have been targeted for removal prior to the physical removal of the articles from the article dispensing machine 230. New articles may also be loaded into the merchandising zone 380. In one embodiment, the merchandising zone 380 may consist of a quadrant of each of the storage racks 250. The merchandising zone 380 may be included as any portion or all of the storage unit 248 and/or one or more storage racks 250. The number of compartments 369 included in the merchandising zone 380 may vary. In some embodiments, some or all of one or more of the storage racks 250 of the storage unit 248 may be designated as the merchandising zone 380. If the entirety of one or more storage racks 250 is designated as the merchandising zone 380, these designated storage rack(s) 250 may be located at an optimal height of the storage unit 248 to facilitate easier access for field service representatives. For example, the merchandising zone 380 may be the top-most storage rack 250 so that the field service representative, instead of a storage rack 250 located lower in the storage unit 248 so that the field service representative would not have to bend or crouch down to access the merchandising zone 380.

Furthermore, an article removal bin 384 may be located at the bottom of the article dispensing machine 230 for collecting media articles for removal. Media articles moved into the article removal bin 384 may include damaged articles, fraudulent articles, or DNR articles that are no longer eligible for rental or sale. In one embodiment, thinned articles may be moved into the article removal bin 384. Damaged articles, fraudulent articles, DNR articles, thinned articles, and other statuses of media articles are detailed below. The inventory stocking personnel or field service representatives may physically remove the media articles from the article removal bin 384 when inventory management of the article dispensing machine 230 is performed, as described below. In one embodiment, the article removal bin 384 may be an open bin that articles being removed may be dropped into. In other embodiments, the article removal bin 384 may include slots and/or compartments for the articles being removed. The article removal bin 384 may include an incline to improve and optimize the loading of articles into the article removal bin 384.

The article removal bin 384 and/or the use of additional storage racks 250 of the storage unit 248 can significantly increase the inventory capacity of the article dispensing machine 230. A previous version of an article dispensing machine may have an inventory capacity of 710 media articles, of which 80 media articles are unavailable for rental or sale to a customer. Accordingly, 630 media articles would be available for rental of sale to a customer in this previous version. The invention allows for installation and use of the article removal bin 384 and/or one or more additional storage racks 250 in place of the inventory space previously used for the 80 media articles that are unavailable for rental or sale.

In one embodiment, an additional storage rack 250 of the storage unit 248 may allow storage of 87 additional media articles that are available for rental or sale to a customer, and an article removal bin 384 may allow storage of 60-100 additional media articles that are not available for rental or sale to the customer. The overall inventory capacity of the article dispensing machine 230 in this embodiment may therefore be increased from 710 to 777-817 media articles, an increase of 9.4-15%. In this embodiment, the number of media articles available for rental or sale may be increased from 630 to 717 media articles, an increase of 13.8%.

In another embodiment, an article removal bin 384 may allow storage of up to 150 media articles that are not available for rental or sale to the customer. The overall inventory capacity of the article dispensing machine 230 in this embodiment may be increased from 710 to 780 media articles, an increase of nearly 9.9%, with the 150 additional media articles not available for rental or sale.

The article dispensing machine 230 may include an automated self healer job that optimizes and maximizes the availability of article inventory. For example, if an article has an unknown identity due to errors or other reasons, the self healer job may attempt to determine the identity of the unknown articles. Unknown articles may initially be unidentifiable if the article dispensing machine 230 is unable to capture identifier information on the article due to problems with the sensor 370, a missing identifier, a misaligned identifier, etc. These unknown articles may be placed in the article removal bin 384 and/or the merchandising zone 380, if the unknown articles can be identified and if it is determined that the unknown articles are to be removed from the article dispensing machine 230.

The physical media article in an article dispensing machine 230 may include at least a DVD, Blu-Ray disc, video game disc, or other media article. Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. Communication with the central controller 302 may be interrupted if the load at the central controller 302 is above a certain threshold. For example, the central controller 302 may direct the article dispensing machine 230 to only transmit certain types of messages and/or transactions, e.g., financial authorizations, until the load has decreased. In these cases, transaction data can be stored locally in the article dispensing machine 230, such as in the article dispensing machine memory storage device 281, until a predetermined time interval elapses, when a predetermined number of transactions is reached, until communication with the central controller 302 can be reestablished, or the load at the central controller 302 has decreased. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302 and central database 304 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in an inventory database can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article.

Figure 6:
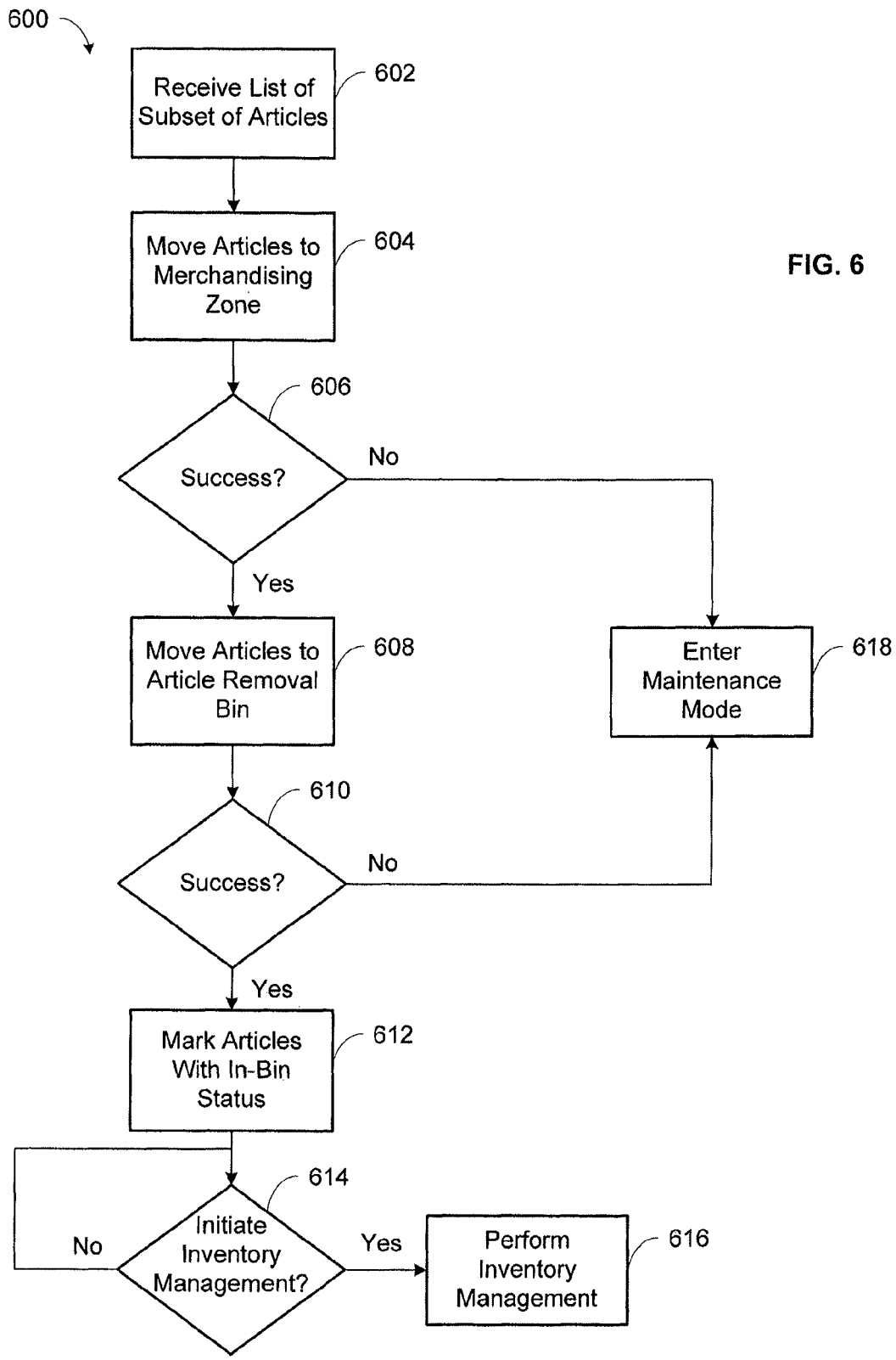
FIG. 6 is a flowchart illustrating operations for optimizing utilization of inventory space in an article dispensing machine.

An embodiment of a process 600 for optimizing the utilization of inventory space for media articles is shown in FIG. 6. The process 600 can result in the management, removal, and loading of media articles into space designated for storage of inventory in an article dispensing machine 230. In some embodiments, the space in the article dispensing machine 230 may have been previously empty, unused, or otherwise unavailable for storing article inventory, for example, and the invention allows for optimal usage of this space. Increased capacity to store media articles that are rentable or sellable to customers from the article dispensing machine 230 may result, as described above. A customer may rent and/or purchase one or more media articles from an article dispensing machine 230 during a transaction. Multiple copies of the same media article may be present in an article dispensing machine 230 so that the media article is available to multiple customers. For example, a new release of a DVD or Blu-Ray disc of a recent movie may have a higher demand than a DVD or Blu-Ray disc for an older movie. In this case, more copies of the new release may be stocked in the article dispensing machine 230 in anticipation of the higher demand.

The operator of the article dispensing machine 230 may have agreements with the producers, manufacturers, distributors, and/or developers of the media articles that dictate the manner, location, pricing, duration, disposal, and/or other parameters related to the rental and sale of the media articles. Some agreements may include a transaction eligibility cutoff date that specifies the last date that a media article may be rented or sold. For example, the operator may have an agreement with a movie studio that allows DVDs and Blu-Ray discs from that movie studio to be rented for a certain time period, after which the DVDs and Blu-Ray discs must be returned or destroyed. As another example, the operator may have an agreement with a video game developer that allows a certain number of video game discs from that developer to be stocked for rental or sale in an article dispensing machine 230 for a certain time period, after which a lower number of video game discs may be stocked. Some agreements may specify that the removal of media articles from article dispensing machines 230 at certain dates prior to the transaction eligibility cutoff date may result in reduced costs. The process 600 may therefore be used in cases where an agreement dictates the removal of media articles from the article dispensing machine 230, e.g., if media articles must be returned, destroyed, reduced, or otherwise removed.

Media articles may also be removed from the article dispensing machine 230 using the process 600 if the operator makes a business decision to reduce or eliminate the availability of a media article for rent or purchase, such as if a media article has rentals or sales that are below expectations, or if a media article is an older title. For example, analysis of sales and rental data stored in the database 304 may determine how long a media article has been stored in inventory. As another example, a profitability analysis of sales and rental data may determine which media articles are selling well and which are not. Other media articles may be removed from the article dispensing machine 230 using the process 600 if the media articles are damaged, fraudulent, or for other reasons. Through use of the process 600, some or all of the media articles stored in the article dispensing machine 230 can be automatically sorted into one or more predetermined areas prior to any manual interaction with a field service representative.

Media articles that may be removed from an article dispensing machine 230 may fall into various categories, including thinned articles, damaged articles, fraudulent articles, rebalancing articles, and do not rent (DNR) articles. A particular media article may be designated as a thinned article if the operator of the article dispensing machine 230 wishes to reduce the stocked number of the particular media article, such as when the transaction eligibility cutoff date is upcoming or as a result of the operator's business decision, e.g., rentals or sales are below projections. A subset of thinned articles may be designated as rebalancing articles if the operator of the article dispensing machine 230 wishes to place particular media articles in another article dispensing machine 230. Accordingly, thinned articles may be removed from the article dispensing machine 230 prior to the expiration of the transaction eligibility cutoff date or other specified date using the process 600.

If a particular media article becomes damaged or otherwise unplayable, the media article may be designated as a damaged article may be removed from the article dispensing machine 230 so that a customer cannot rent or purchase it. Media articles that have been reported as being fraudulent can be designed as fraudulent articles that may also be removed from the article dispensing machine 230 so that a customer cannot rent or purchase it.

Furthermore, a particular media article may be designated as a do not rent (DNR) article if the transaction eligibility cutoff date for the particular media article has passed so that the particular media article is not eligible to be rented or sold. In some cases, an agreement may specify penalties if a DNR article is not removed from an article dispensing machine 230 by the cutoff date. The agreement or contract may specify that DNR articles must be destroyed or returned to a distributor, studio, etc. There may be one or more categories of DNR articles that specify the relative urgency of whether a particular media article needs to be removed from the article dispensing machine 230.

New media articles may also be loaded into the article dispensing machine 230 to replace the media articles which have been removed. The new media articles may include, for example, new releases of DVDs, Blu-Ray discs, and video game discs for rental or sale to customers. Media articles of previously released media content, such as older movies or video games, may also be loaded into the article dispensing machine as new media articles. One or more copies of a particular media article may be loaded as new media articles. Inventory space for these new media articles that can be rented or sold to customers may be increased by moving media articles to the merchandising zone 380 and/or article removal bin 384, which are ultimately physically removed from the article dispensing machine 230.

At step 602, a list that identifies a subset of media articles targeted for removal may be received at an article dispensing machine 230. The list may include thinned articles (including rebalancing articles), damaged articles, fraudulent articles, and/or DNR articles that are specified by the operator of the article dispensing machine 230. As described above, these media articles may be targeted for removal based on agreements and/or business decisions related to the reduction of stock for the particular media articles. The list of the subset of media articles may be in an XML format or other appropriate format. The article dispensing machine 230 may receive the list from the central controller 302. The subset of media articles may have been manually or automatically selected for the list based on analysis of sales and rental data, for example. The subset of media articles identified in the list may be moved from the storage unit 248 to the merchandising zone 380 and/or the article removal bin 384, depending on various factors. These factors may include how the media articles have been designated, the available space in the merchandising zone 380, and the available space in the article removal bin 384.

Media articles may be moved to the merchandising zone 380 from other areas of the storage unit 248 at step 604. In one embodiment, thinned articles (including rebalancing articles) may be moved to the merchandising zone 380 at step 604. In another embodiment, any media article targeted for removal, including thinned articles, damaged articles, fraudulent articles, and/or DNR articles may be moved at step 604 from the other areas of the storage unit 248 to the merchandising zone 380. The picker device 264 may move a media article from a compartment 369 in a non-merchandising zone area of the storage unit 248 to a compartment 369 in the merchandising zone 380. In one embodiment, media articles that are placed in the merchandising zone 380 may be placed from top to bottom and left to right, starting with a first storage rack 250. The media articles moved at step 604 may be based on the list of the subset of media articles received at step 602. The moving of thinned articles and/or other media articles at step 604 may be known as a thin job that can be executed on a periodic basis. For example, the thin job may be executed on a daily basis following a scheduled reboot of the article dispensing machine 230. If the thin job is successfully executed at step 606, then the process 600 continues to step 608.

However, if the thin job is not successfully executed at step 606, such as if an error code is detected due to a mechanical or software issue, then the article dispensing machine 230 may enter a maintenance mode at step 618. In this case, the article dispensing machine 230 may remain in the maintenance mode and not allow any customer transactions until serviced by a field service representative. At step 606, a message may be transmitted to the central controller 302 that the thin job either successfully executed or did not successfully execute. A thin job may not successfully execute due to an error code or if the article dispensing machine 230 is loaded with new media articles before the thin job has completed. In this case, the media articles that did not get moved to the merchandising zone 380 by the initial thin job may be moved to the merchandising zone 380 by a later-executed thin job.

If a media article that is targeted for removal is not present in the article dispensing machine 230 when the thin job is executed at step 604 but is later returned by a customer, that media article may be placed in a non-merchandising zone area of the storage unit 248 upon return. The media article may then be moved to the merchandising zone 380 when the next thin job is executed. Furthermore, thinned and other media articles in the merchandising zone 380 may be rented or purchased by a customer from the article dispensing machine 230.

At step 608, media articles may be moved to the article removal bin 384 from the storage unit 248. In one embodiment, DNR articles, damaged articles, and/or fraudulent articles may be moved from a non-merchandising zone portion of the storage unit 248 and/or to the article removal bin 384 at step 608. In another embodiment, thinned articles may be moved from a non-merchandising zone portion of the storage unit 248 to the article removal bin 384 at step 608. In a further embodiment, media articles that had previously been moved to the merchandising zone 380 at step 604 may be moved from the merchandising zone 380 to the article removal bin 384 at step 608. The media articles placed in the article removal bin 384 may be based on the list of the subset of media articles received at step 602.

The picker device 264 may retrieve the media article from a compartment 369 in the storage unit 248 to the article removal bin 384. The moving media articles may be known as a load bin job that can be executed on a periodic basis. For example, the load bin job may be executed on a daily basis following execution of the thin job at step 604. If the load bin job is successfully executed at step 610, then the process 600 continues to step 612. However, if the load bin job is not successfully executed at step 610, such as if an error code is detected due to a mechanical or software issue, then the article dispensing machine 230 may enter a maintenance mode at step 618. In this case, the article dispensing machine 230 may remain in the maintenance mode and not allow any customer transactions until serviced by a field service representative. A maximum number of media articles that are allowed to be moved into the article removal bin 384 may be defined. Accordingly, the number of media articles loaded into the article removal bin 384 may be tracked so that the article removal bin 384 is not overloaded.

The media articles moved into the article removal bin 384 may be marked in a database with an in-bin status at step 612. The database may include an inventory database within the article dispensing machine database 282, central database 304, or other database. Marking the status of the articles in the database assists in keeping track of the location of each piece of inventory. Each article may have a unique identifier, such as a barcode, serial number, radio frequency identification (RFID) tag, or other identifier, that identifies characteristics of the article, such as a title, type, and other information. When the media articles are moved into the article removal bin 384, their unique identifiers may have been read by the sensor 370, for example.

As discussed above, media articles may be categorized with a variety of statuses, including in-bin, thinned, damaged, fraudulent, DNR, and unknown. Media articles may also be categorized with other statuses, whether they are physically located in the article dispensing machine 230 or located elsewhere. These other statuses include in-kiosk, removed, missing, rented, wrong title, received, sold, and destroyed. The in-kiosk and removed statuses are discussed further below. A media article designated as a missing article is a particular media article that was expected to be one location or slot in the storage unit 248 but is not actually located there. The location or slot in the storage unit 248, in this case, may be empty or contain another media article. A rented article is a media article that has been rented to a customer. A media article that is designated as a wrong title article is a particular media article that has been reported to have the wrong title associated with it in the inventory database. Wrong title articles in the article dispensing machine 230, if present, may also be targeted for removal. A received article is a media article that has been reported as being received by the warehouse or distribution center following removal from the article dispensing machine 230. A sold article is a media article that has been sold out of the inventory of the article dispensing machine 230. A media article designated as a destroyed article is a particular media article that has been destroyed, including those destroyed pursuant to an agreement.

At step 614, it is determined whether a command for initiating inventory management of the article dispensing machine 230 has been received. In one embodiment, inventory management may be initiated by a field service representative who logs into the article dispensing machine 230 using the user interface 234 for the purpose of removal and loading of media articles. If inventory management has not been initiated at step 614, then the process 600 returns to step 614 to await the initiation of inventory management. In one embodiment, the process 600 can return to step 602 to receive another list of a subset of media articles that are targeted for removal, as described above. However, if inventory management has been initiated at step 614, then inventory management can be performed at step 616. During inventory management, the user interface 234 may display instructions, graphics, and/or other information to assist the field service representative in the removal and loading of media articles from the article dispensing machine 230. For example, the user interface 234 may display and/or indicate a particular storage rack 250 and/or compartment 369 corresponding to a media article that is to be removed or where a media article is to be loaded.

Figure 7:
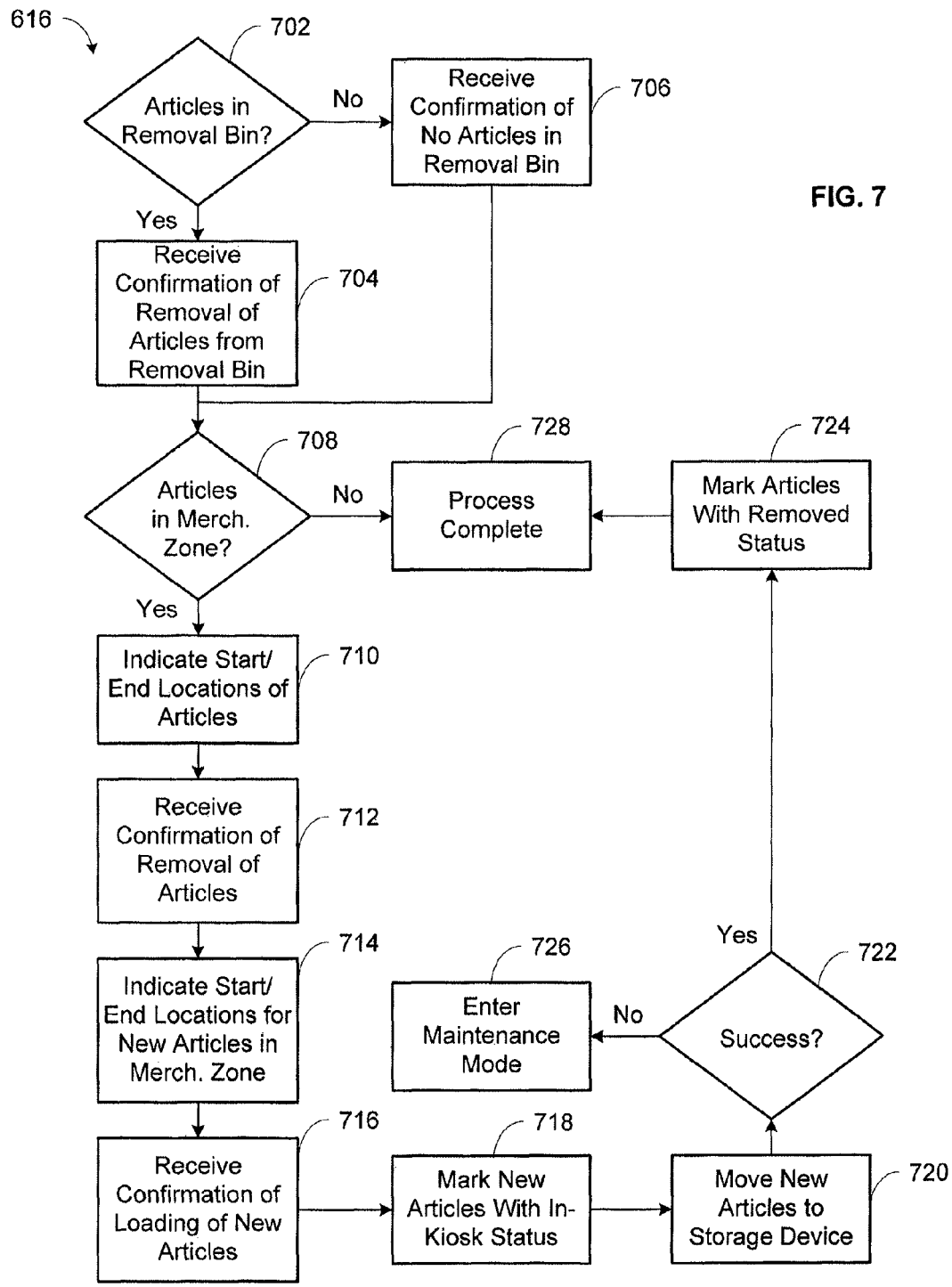
FIG. 7 is a flowchart illustrating operations for removing and loading articles into inventory space in an article dispensing machine.

An embodiment of step 616 for performing inventory management is shown in more detail with reference to FIG. 7. At step 702 of FIG. 7, it is determined whether any media articles have been moved into the article removal bin 384. Thinned articles, DNR articles, damaged articles, and/or fraudulent articles may have been placed in the article removal bin 384 at step 608, as described above. If no media articles have been moved into the article removal bin 384, then at step 706, the article dispensing machine 230 awaits receipt of confirmation that there are no media articles in the article removal bin 384. The field service representative may interact with the user interface 234 to confirm that there are no media articles in the article removal bin 384 at step 706. However, if media articles have been moved into the article removal bin 384, then at step 704, the article dispensing machine 230 awaits receipt of confirmation that the media articles have been removed from the article removal bin 384. The field service representative may remove the media articles from the article removal bin 384 then interact with the user interface 234 to confirm that the media articles have been removed from the article removal bin 384 at step 704.

Next, it is determined at step 708 whether media articles have been moved into the merchandising zone 380. Thinned articles and/or other articles targeted for removal may have been moved into the merchandising zone 380 from other areas of the storage unit 248 at step 604, as described above. If no media articles have been moved into the merchandising zone 380, then the process 616 is complete at step 728. However, if media articles have been moved into the merchandising zone 380, then the process 616 continues to step 710. At step 710, the starting and/or ending locations of the thinned and other media articles in the merchandising zone 380 may be indicated on the user interface 234 so that the field service representative is informed of which media articles to remove from the article dispensing machine 230. Other visual, audio, and/or tactile indicators may be used to inform the field service representative of the locations of the media articles to be removed. In one embodiment, the picker device 264 may remove some of the initial media articles from the merchandising zone 380 so that the field service representative knows the beginning portion of which media articles to remove. The remainder of the media articles may subsequently be removed from the merchandising zone 380 by the field service representative. In some embodiments, there may be media articles targeted for removal that are stored outside of the merchandising zone 380 because the merchandising zone 380 is full. In this case, the article dispensing machine 230 may automatically dispense these media articles through the article transfer opening 244. In other embodiments, the motors 251 and 262 may be turned off at step 710 so that the field service representative may manually and freely rotate the storage unit 248 to access the merchandising zone 380.

The article dispensing machine 230 awaits receipt of confirmation that the media articles in the merchandising zone 380 have been removed at step 712. The field service representative may interact with the user interface 234 to confirm that the media articles have been removed from the merchandising zone 380 at step 712. In one embodiment, the article dispensing machine 230 may automatically determine whether the media articles have been removed from the merchandising zone 380 by using the sensor 270, for example. Once the media articles have been removed from the merchandising zone 380, new media articles may be loaded into the merchandising zone 380 by the field service representative. The starting and/or ending locations for where to load the new media articles may be indicated on the user interface 234 at step 714. Other visual, audio, and/or tactile indicators may be used to inform the field service representative of the locations where to load the new media articles. In one embodiment, new media articles may be loaded into the merchandising zone 380 from bottom to top and right to left, starting with a last storage rack 250. New media articles may include multiple copies of new releases and/or other media articles that will be available for rental or purchase by customers.

It is possible that there may be more new media articles to load into the merchandising zone 380 than available slots in the merchandising zone 380. In this case, the field service representative may enter a maintenance mode of the article dispensing machine 230. In one embodiment, the remaining new media articles that need to be loaded into the article dispensing machine 230 may be individually loaded through the article transfer opening 244 so that these media articles can be stored in other portions of the storage unit 248. In another embodiment, another thin job may be manually executed to remove further media articles from the inventory of the article dispensing machine 230 to make room for the new media articles.

After the new media articles are loaded into the merchandising zone 380, the article dispensing machine 230 awaits receipt of confirmation that the new media articles have been loaded at step 716. The field service representative may interact with the user interface 234 to confirm that the new media articles have been loaded into the merchandising zone 380 at step 716. In one embodiment, the dispensing machine 230 may automatically determine whether the new media articles have been loaded into the merchandising zone 380 by using the sensor 270, for example. The new media articles that have been loaded may be marked in a database with an in-kiosk status at step 718. The database may include an inventory database within the article dispensing machine database 282, central database 304, or other database.

The new media articles may be moved from the merchandising zone 380 to other areas of the storage unit 248 at step 720. The moving of new media articles at step 720 may be known as a merchandising zone synchronization job. The field service representative may initiate or schedule the merchandising zone synchronization job. In one embodiment, the merchandising zone synchronization job may be remotely initiated from the central controller 302. In another embodiment, the motors 251 and 262 may be activated so that the merchandising zone synchronization job can be executed, if the motors 251 and 262 had been turned off at step 710. New media articles may be rented or purchased by customers when the new media articles are in the merchandising zone 380, prior to or during execution of the merchandising zone synchronization job. A customer may also rent or purchase the new media articles after execution of the merchandising zone synchronization job when the new media articles have been moved to the non-merchandising zone area of the storage unit 248.

In some embodiments, the merchandising zone synchronization job may move some or all of the new media articles to optimized receiving slots 369 and/or optimized storage racks 250 that are nearest to the location of the picker device 264. In this way, the picker device 264 may have not have to travel as far to access a particular new media article when a customer rents or buys that new media article. The new media articles may include new releases or other titles with rental or sales volumes that are anticipated to be higher than for other media articles, for example. There may be less wear and tear on the picker device 264 and associated machinery because the picker device 264 would not have to travel as far to access these more popular media articles. In addition, a customer transaction may be completed more quickly. For example, the picker device 264 may typically be located near the article transfer opening 244, particularly following a customer transaction. In this case, placing new media articles that are likely to be rented or bought in the optimized receiving slots 369 and/or the optimized storage racks 250 that are nearest to the location of the picker device 264 will speed customer transactions involving these media articles.

If the merchandising zone synchronization job is not successful at step 722, such as if an error code is detected due to a mechanical or software issue, then the article dispensing machine 230 may enter a maintenance mode at step 726. The article dispensing machine 230 may remain in the maintenance mode and not allow any customer transactions until serviced by a field service representative. However, if the merchandising zone synchronization job is successful at step 722, then the process 616 continues to step 724. At step 724, the thinned articles and/or other media articles that had been removed from the merchandising zone 380 may be marked in a database with a removed status. In some embodiments, the thinned articles and/or other media articles may be marked with a removed status at step 712 when the field service representative has confirmed the removal of the thinned articles from the merchandising zone 380. A media article with a removed status has been physically removed from the article dispensing machine 230. An inventory report may be transmitted from the article dispensing machine 230 to the central controller 302 after a successful execution of the merchandising zone synchronization job. Following step 724, the process 616 is complete at step 728.

In one embodiment, a merchandising zone unload job may be executed on a periodic basis to unload thinned and/or other media articles from the merchandising zone 380. The merchandising zone unload job may be executed in parallel with a thin job so that a media article may be moved from the merchandising zone 380 to a non-merchandising zone of the storage unit 248, then another media article may be moved into the merchandising zone 380 to replace the previously moved media article. Some or all of the merchandising zone 380 may be reserved for thinned or non-removed articles unless that space is needed for other purposes.

The thin job, load bin job, merchandising zone synchronization job, merchandising zone unload job, self healer job, and other jobs that are periodically and/or automatically executed by the article dispensing machine 230 may each have a priority assigned to them. The priority may determine whether or not the job is executed at a scheduled time, based on whether the article dispensing machine 230 is performing other tasks. For example, if a customer is involved in a transaction at the article dispensing machine 230 at the time when a thin job is scheduled to be executed, the transaction can be allowed to continue and the thin job will execute after the transaction is completed. Jobs may also be interruptible and resumable so that other jobs or actions with higher priorities may be executed. In this way, jobs with longer durations may be interrupted and/or not started to allow higher priority jobs with shorter durations to execute, such as rental or return transactions involving a customer.

Figure 8:
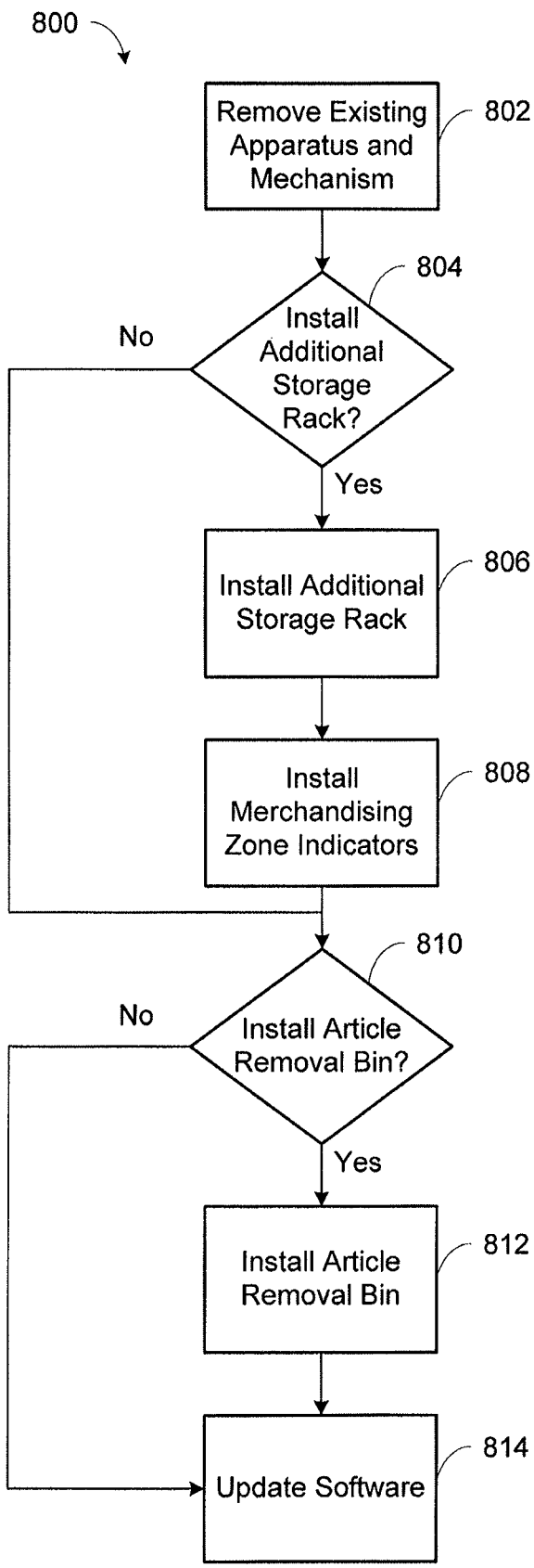
FIG. 8 is a flowchart illustrating operations for installing additional inventory space in an article dispensing machine.

A process 800 for retrofitting a previous version of an article dispensing machine to incorporate the invention described above is shown in FIG. 8. The process 800 may result in the installation and addition of an article removal bin 384 to the article dispensing machine 230 and/or one or more additional storage racks 250 to the storage unit 248 to increase the overall inventory capacity of the article dispensing machine 230. As seen in FIG. 4, the article removal bin 384 may be installed in the bottom portion of the article dispensing machine 230 so that the selector arm 256 and the picker device 264 may deposit media articles targeted for removal in the article removal bin 384. An additional storage rack 250 may be installed in the storage unit 248 and be rotated along with the other storage racks 250 by the driven shaft 252. The additional storage rack(s) 250 (not shown) may be installed at the top or the bottom of the exiting storage racks 250, for example.

At step 802, any existing apparatus and/or mechanisms in the article dispensing machine 230 may be removed or cleared from the area(s) where the article removal bin 384 and/or the additional storage rack 250 are to be installed. For example, obsolete or unused storage apparatuses, wiring, and/or other mechanisms may be removed or cleared from the bottom interior of the article dispensing machine 230. The existing apparatus and/or mechanisms may also be secured so that they do not interfere with installation of the article removal bin 384 and/or additional storage rack 250, e.g., bundling wires together and securing the bundle to a rail. At step 804, it may be determined whether one or more additional storage rack(s) 250 are to be installed in the article dispensing machine 230. An additional storage rack 250 may not be installed if there is insufficient space in the article dispensing machine 230 or if a business decision has been made to not install an additional storage rack 250, for example. If additional storage racks 250 are not to be installed at step 804, then the process 800 continues to step 810, detailed below.

However, if additional storage racks 250 are to be installed at step 804, then at step 806, the additional storage rack(s) 250 may be installed. The additional storage rack(s) 250 may be substantially similar to an existing storage rack 250 in the storage unit 248, and may be connected to the driven shaft 252 so that the entire storage unit 248 rotates together. In one embodiment, the additional storage rack(s) 250 and the existing storage racks 250 may rotate independently of one another. At step 808, indicators identifying the merchandising zone 380 may be installed on some or all of the storage racks 250, including the newly-installed additional storage rack(s) 250. The indicators may include color-coded rods 382, for example, as shown in FIG. 5. The indicators may delineate the merchandising zone 380 so that inventory stocking personnel and/or field service representatives can quickly and easily identify the merchandising zone 380.

At step 810, it may be determined whether one or more article removal bins 384 are to be installed in the article dispensing machine 230. An article removal bin 384 may not be installed if there is insufficient space in the article dispensing machine 230 or if a business decision has been made to not install an article removal bin 384, for example. If an article removal bin 384 is not to be installed at step 810, then the process 800 continues to step 814, detailed below. However, if an article removal bin 384 is to be installed at step 810, then at step 812, the article removal bin 384 may be installed. The article removal bin 384 may be placed in the bottom interior of the article dispensing machine 230 and may be secured to the article dispensing machine 230 so that it is stationary but removable. More than one article removal bin 384 may be installed so that media articles in different categories can be segregated, for example. At step 814, the software and/or firmware of the article dispensing machine 230 may be updated so that the newly-installed article removal bin(s) 384 and/or additional storage rack(s) 250 may be utilized as additional inventory capacity. The update software and/or firmware may enable the selector arm 256 and the picker device 264 to deposit media articles targeted for removal in the article removal bin 384 and merchandising zone 380, for example.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

It should be emphasized that the above-described embodiments of the invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the invention and protected by the following claims.

The invention claimed is:

1. A method of utilization of an inventory space of an article dispensing machine for a plurality of articles in the article dispensing machine, the article dispensing machine comprising:
   a controller,
   a memory,
   a selector arm,
   a motor associated with the selector arm,
   a non-removable storage unit, the non-removable storage unit comprising one or more storage racks for holding the plurality of articles in a plurality of receiving slots in the article dispensing machine, and
   a set of instructions for execution by the controller installed within the memory for controlling the operation of the article dispensing machine, the method comprising the steps of:
   installing an article removal bin in the article dispensing machine, wherein the article removal bin is for holding a first subset of the plurality of articles, the first subset targeted for removal from the article dispensing machine based on predetermined article removal criteria;
   updating the set of instructions installed in the memory of the article dispensing machine to create an updated set of instructions, the updated set of instructions for allowing the first subset of the plurality of articles to be placed in the article removal bin for subsequent removal from the article dispensing machine; and
   controlling the selector arm with the motor to:
   (a) retrieve at least one article of the first subset of the plurality of articles;
   (b) deposit the at least one article of the first subset in the article removal bin.

2. The method of claim 1, further comprising the step of adding an additional storage rack to the non-removable storage unit, wherein the additional storage rack is for holding a second subset of the plurality of articles, the second subset being targeted for commercial sale or rental; and
the first subset and the second subset are different groups of articles, and the groups do not overlap.

3. The method of claim 2, further comprising the step of providing targeted space in the article dispensing machine for one or more of the additional storage racks to be added or the article removal bin to be installed.

4. The method of claim 3, wherein providing the targeted space comprises one or more of removing an existing apparatus in the article dispensing machine.

5. The method of claim 4, wherein the one or more additional storage racks rotates together with the one or more storage racks.

6. The method of claim 2, further comprising adding the additional storage rack at an optimal height within the storage unit, the optimal height being based on making adding and removing articles from the article dispensing machine easier for service personnel.

7. The method of claim 2, further comprising rotating the additional storage rack between an optimal height within the storage unit and a bottom portion of the article dispensing machine, the optimal height being based on making adding and removing articles from the article dispensing machine easier for service personnel.

8. The method of claim 7, further comprising, rotating the additional storage rack along with the other storage racks by a shaft driven by a second motor.

9. The method of claim 1, further comprising installing a merchandising zone indicator on the one or more storage racks, wherein the merchandising zone indicator is for visually identifying a merchandising zone of the non-removable storage unit, the merchandising zone for holding one or more of a second subset of the plurality of articles or a new article which include articles designated for subsequent removal from the article dispensing machine and no longer available for dispensing to a customer, and/or which have been added to the article dispensing machine for dispensing to a customer.

10. The method of claim 1, further comprising adding the article removal bin in a bottom portion of the article dispensing machine.

11. The method of claim 1, wherein the article dispensing machine includes an additional motor coupled to the non-removable storage unit; and both the motor associated with the selector arm and the additional motor are stepper motors.

12. A method of retrofitting an article dispensing machine for utilization of inventory space for a plurality of articles in the article dispensing machine, the article dispensing machine comprising:
   a controller,
   a memory,
   a selector arm,
   a motor associated with the selector arm,
   a non-removable storage unit, the non-removable storage unit comprising one or more storage racks for holding the plurality of articles in a plurality of receiving slots in the article dispensing machine, and a set of instructions for execution by the controller installed within the memory for controlling the operation of the article dispensing machine, the method comprising the steps of:

installing an article removal bin in the article dispensing machine, wherein the article removal bin is for holding a first subset of the plurality of articles, the first subset of the plurality of articles targeted for removal from the article dispensing machine based on predetermined article removal criteria;

identifying the first subset of the plurality of articles, the first subset of the plurality of articles targeted for removal from the article dispensing machine, wherein the first subset of the plurality of articles targeted for removal comprises one or more of a thinned article, a damaged article, a fraudulent article, a wrong title article, and/or a do not rent (DNR) article;

updating the set of instructions of the article dispensing machine to create an updated set of instructions, the updated set of instructions for allowing the first subset of the plurality of articles to be placed in the article removal bin; and controlling the selector arm with the motor to:
(a) retrieve at least one article of the subset of the plurality of articles;
(b) deposit the at least one article of the subset of the plurality of articles in the article removal bin.

13. The method of claim 12, further comprising the step of adding an additional storage rack to the non-removable storage unit, wherein the additional storage rack is for holding a second subset of the plurality of articles, the second subset being targeted for commercial sale or rental; and the first subset and the second subset are different groups of articles, and the groups do not overlap.

14. The method of claim 13, further comprising the step of providing targeted space in the article dispensing machine for one or more of the additional storage racks to be added or the article removal bin to be installed.

15. The method of claim 14, wherein providing the targeted space comprises removing an existing apparatus in the article dispensing machine.

16. The method of claim 13, wherein the additional storage rack is configured to rotate together with the one or more storage racks.

17. The method of claim 13, further comprising adding the additional storage rack at an optimal height within the storage unit, the optimal height being based on making adding and removing articles from the article dispensing machine easier for service personnel.

18. The method of claim 12, further comprising installing a merchandising zone indicator on the one or more storage racks, wherein the merchandising zone indicator is for visually identifying a merchandising zone of the non-removable storage unit, the merchandising zone for holding one or more of a second subset of the plurality of articles or a new article, which include articles designated for subsequent removal from the article dispensing machine and no longer available for dispensing to a customer, and/or which have been added to the article dispensing machine for dispensing to a customer.

19. The method of claim 12, wherein the selector arm includes a U-shaped picker device.

20. The method of claim 12, further comprising adding the article removal bin in a bottom portion of the article dispensing machine.

* * * * *